Dec. 1 1925.
J. H. SENNETT
1,563,664
METHOD OF MAKING PIPE COUPLINGS
Filed May 11, 1923
FIG. I.
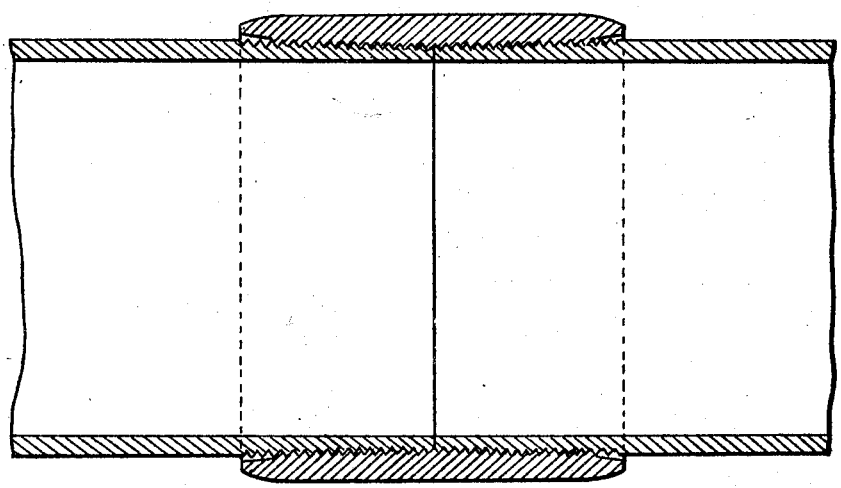
FIG. II.
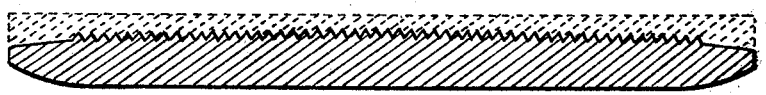
FIG. III.
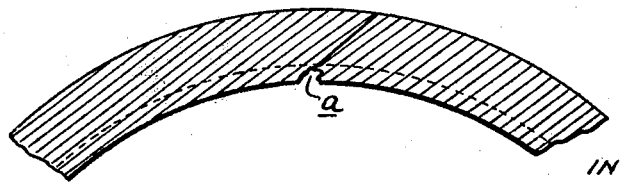
WITNESSES
INVENTOR Patented Dec. 1, 1925.

1,563,664

UNITED STATES PATENT OFFICE.

JOHN H. SENNETT, OF WOODLAWN, PENNSYLVANIA.

METHOD OF MAKING PIPE COUPLINGS.

Application filed May 11, 1923. Serial No. 638,191.

*To all whom it may concern:*

Be it known that I, JOHN H. SENNETT, residing at Woodlawn, in the county of Beaver and State of Pennsylvania, a citizen of the United States, have invented or discovered certain new and useful Improvements in Methods of Making Pipe Couplings, of which improvements the following is a specification.

My invention relates to improvements in methods of forming pipe couplings. It concerns a welded coupling formed of steel, as distinguished from wrought iron, and free of the defects which, hitherto ineradicable, have forbid the production on commercial scale of welded steel couplings, although the successful production of such an article is greatly to be desired.

A pipe coupling in the ordinary use of the term, and with the meaning with which I use it, is a ring—a short cylindrical sleeve, internally screw-threaded, adapted to receive through its two ends the screw-threaded ends of two pipe-lengths, and so to unite the pipe-lengths into a continuous conduit.

Such a pipe coupling is of notably great use in the petroleum and natural gas industries, for the forming of casings for wells and for the conveyance of oil and gas and for other ancillary purposes. The necessity is for strong pipe, strongly coupled, capable of easy and sure application in the field, adapted to hard service, and having tight joints, capable of withstanding high pressures.

The pipe itself is welded steel pipe. But when it comes to the forming of the couplings, the material and the procedure followed in the production of the pipe, are inadequate and, for this reason. The welding of the ends of the blank is imperfect. The seam formed in the inner wall or bore of the welded blank contains small flaws. When, thereafter, in pursuance of the usual procedure, the blank is internally screw-threaded, the flaws which I here mention will constitute blemishes in the threads, and such blemishes will render the coupling unsatisfactory, interfering with easy application and removal, causing mutilation of the threads of a screwed-in pipe, and affording perhaps insecure and leaky joint.

Couplings formed of seamless tube are a possibility, so also are pressed steel couplings, but both are too expensive. The art, therefore, has come to use welded iron couplings. As compared with steel, if it could be satisfactorily produced, an iron coupling is relatively weak and relatively costly. Hence the advantage of a welded steel coupling, if only it can be produced. And my invention achieves production in a manner and with a result wholly practical.

I shall, in connection with the ensuing description, refer to the accompanying drawings. Fig. I is a view in medial and longitudinal section of two lengths of pipe united by the coupling of my invention. Fig. II is a view to larger scale, and illustrating in longitudinal section through its wall, a coupling of my invention, and the mode of production. Fig. III is a fragmentary view also to larger scale, and on transverse section, through the wall of an unfinished article, illustrating, still further the mode of production.

A welded coupling is formed by coiling a flat plate or bar to an annulus, and welding the edges so brought into contact. The operations of coiling and welding are performed in continuity upon the plate in heated condition. The article is shaped about a cylindrical mandrel and welding is effected by the action of rolls bearing upon the metal from without and exerting their pressure against the resisting body of the mandrel within.

I have perceived that in consequence of this difference in the manner of engagement between forming body and work on inside and outside (within, the work is pressed upon a stationary mandrel; without, rolls keep traversing the seam) the union which is formed, though otherwise it may be and ordinarily is quite perfect, is, in the inner wall of the blank, and immediately adjacent the mandrel surface, imperfect and flawed. There are small gaps, small intervals interrupting the continuity of the weld. And I have further perceived that, not only are these gaps or flaws found at the inner surface of the blank and immediately adjacent the surface of the mandrel upon which the blank is formed and welded, but that ranging through the various sizes of couplings which the industry demands, the flaws are of substantially consistent dimensions, and lie wholly within a range of about one-eighth of an inch from the inner face of the blank.

My invention consists in taking as the material out of which to form the desired coupling a plate or bar of greater thickness than otherwise would be required, and shaping it on a mandrel smaller than otherwise would be required, and so producing a blank which externally is of normal size, but which is abnormally thick-walled, and whose bore is abnormally small. Subsequently I proceed to cut the threads, and in so doing I remove the excess metal, and with the excess I remove all the flawed portion and sink the thread to a depth exceeding the depth of flaws. Thus I produce a coupling of ultimate normal size, and a coupling whose thread is, because of the peculiar procedure indicated, free from the defects which have rendered welded steel couplings as hitherto produced, impractical.

Turning to the drawings, Fig. I shows the normal finished coupling in use, with adjacent lengths of threaded pipe applied to it. By way of example merely, and not at all by way of limitation, I will give the dimensions of such a coupling. The coupling whose dimensions I here give is for 9-inch pipe. Exterior diameter, 9¾ inches; length 8⅛ inches. The thread tapers inwardly at the rate of ⅜ of an inch on the diameter (3/16 on the radius) to a foot. The threads are eight to the inch and 1/10 of an inch deep. At the ends the coupling is rounded exteriorly, and interiorly is beveled. This modification of inner and outer surfaces extends from the end of the coupling ⅝ of an inch. At that point, ⅝ of an inch from the end the coupling is at the base of the thread ½ an inch thick.

In order to produce a coupling of these dimensions I begin with a plate or bar ¾ of an inch thick. I cut it to size, with scarfed meeting edges, as usual. I then heat the blank and shape and weld it on a mandrel in usual manner. Having so produced my welded annulus, when it otherwise is ready to receive the thread, I first bore it out, removing from the inner surface metal to the depth of 3/16 of an inch. In this boring-out substantially all flaws incident to welding are cut away, and a firm, flawless blank remains, ready to receive the thread.

This matter of boring-out may, obviously, be varied, and various cutting tools employed. And so the boring-out and the thread-cutting need not be separate and successive operations, but may be merged, and made to overlap, within the knowledge and experience of the metal-turning art.

Referring to Fig. II of the drawings, the upper face is the inner face. And in dotted lines the original shape and dimensions of the welded annulus are indicated, and the bulk of material is indicated which in the operation now described is removed, before the threads are cut.

In Fig. III I have indicated diagrammatically how on welding a flaw such as $a$ may remain in the seam on the inner face of the newly welded ring. This flaw I have found will not exceed one eighth of an inch in depth. I bore out to an extent indicated by the dotted line, and in so doing remove all such flaws as $a$, leaving a sound blank to receive the thread.

I have given above particular dimensions, and it remains to say that the present practice in which I am engaged contemplates the production of such couplings for pipes ranging in diameter from 2 to 15½ inches. And as I have said the use which I primarily contemplate is well casing, that is to say, pipe and pipe couplings of quality adequate to serve as casing for oil and gas wells.

Whether large couplings or small are to be produced I employ plate or bar of such dimensions as to give an excess of at least 3/16 of an inch, to be cut away in the manner indicated, preparatory to or incidental to the cutting of the threads, which threads it will be understood, are sunk into the body of the metal beyond the three sixteenths depth. The first three sixteenths are entirely cut away.

The couplings made according to and embodying my invention are 25% to 50% stronger than iron couplings of like dimensions, and are as I have said far cheaper than pressed steel couplings or seamless couplings, the cost of producing which is so great as to be prohibitive.

I claim as my invention:

The method herein described of producing a welded steel pipe coupling which consists in shaping and welding a steel blank whose interior radius is less than the minimum interior radius of the finished article by an amount not less than the depth of flaws in the welded seam, boring out the blank to the depth of such flaws and sinking a thread in the so bored-out blank.

In testimony whereof I have hereunto set my hand.

JOHN H. SENNETT.